United States Patent
Ichikawa

(10) Patent No.: US 6,392,907 B1
(45) Date of Patent: May 21, 2002

(54) NPC INVERTER CONTROL SYSTEM

(75) Inventor: Kosaku Ichikawa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/598,974

(22) Filed: Jun. 22, 2000

(30) Foreign Application Priority Data

Jun. 28, 1999 (JP) .......................................... 11-181690

(51) Int. Cl.$^7$ ................................................ H02M 3/24
(52) U.S. Cl. ........................................ 363/98; 363/132
(58) Field of Search ............................. 363/95, 97, 98, 363/131, 132

(56) References Cited

U.S. PATENT DOCUMENTS 5,442,540 A * 8/1995 Hua et al. ..................... 363/98
5,953,222 A * 9/1999 Mizutani ....................... 363/56

FOREIGN PATENT DOCUMENTS

| JP | 7-312872 | 11/1995 |
| JP | 7-312878 | 11/1995 |

* cited by examiner

Primary Examiner—Peter S. Wong
Assistant Examiner—Gary L. Laxton
(74) Attorney, Agent, or Firm—Foley & Lardner

(57) ABSTRACT

An NPC inverter control system includes a DC power source having a neutral point corresponding to a junction of a pair of capacitors connected in serial one another, a positive electrode and a negative electrode, at least one multi-level inverter circuit having a plurality of semiconductor devices coupled to the DC power source and configured to invert the DC power to an AC power and to supply the AC power to a load, and a plurality of saturatable reactors configured to join the positive and negative electrodes of the DC power source to the multi-level inverter circuit.

22 Claims, 11 Drawing Sheets

US 6,392,907 B1

NPC INVERTER CONTROL SYSTEM

CROSS REFERENCE TO RELATED APPLICATION

This application claims benefit of priority to Japanese Patent Application No. 11-181690 filed Jun. 28, 1999, the entire content of which is incorporated by reference herein.

BACKGROUND OF THE INVENTION

1. Field of the Invention

This invention relates to an NPC(Neutral Point Clamped) inverter control system composed of a direct-current (DC) power source having multiple electric potentials created by a neutral point and multi-level inverter circuits constituted of a plurality of semiconductor devices such as IEGT(Injection Enhanced Gate Transistor) or IGBT (Insulated Gate Bipolar Transistor). More specifically, the invention relates to an NPC inverter control system which ensures safe operation of the semiconductor devices constituting the multi-level inverter circuits and reduce switching loss of the semiconductor devices.

2. Description of the Background

FIG. 1 shows one example of this kind of a conventional NPC inverter control system.

FIG. 1 gives one constituent example showing only one phase of a three-level inverter apparatus as a representative example.

In FIG. 1, the three-level inverter apparatus is composed of a DC power source and three three-level inverter circuits (only one is shown) as multi-level inverter circuits.

The DC power source forms a neutral point corresponding to a junction of two DC powers 1a and 1b serially connected with one another, a positive electrode and a negative electrode.

One of the three-level inverter circuits, controlling a U-phase, is composed of four semiconductor devices US1, US2, US3 and US4 with gate controllers, such as IEGT (Injection Enhanced Gate Transistor), and two diodes UD1 and UD2. The semiconductor devices US1, US2, US3 and US4, and the diodes UD1 and UD2 are connected as shown in FIG. 1 and invert the DC power to an alternating current (AC) power and supply the AC power to a load, such as a motor (not shown in FIG. 1).

An explanation of the operation of the three-level inverter circuit is omitted in this description because of its well-known nature.

Conventional snubber circuits are provided to protect the four semiconductor devices US1, US2, US3 and US4 and two diodes UD1 and UD2 constituting one of the three-level inverter circuits from an excess voltage.

With the increase of a capacity of the three-level inverter circuit, either charge and discharge type of snubber circuits S11a, S11b, S12a and S12b respectively connected to the semiconductor devices US1, US2, US3 and US4 shown in a portion A of FIG. 1, or clamp type of snubber circuits S21a, S21b, S22a and S22b shown in a portion B of FIG. 1 are used.

In recent years, with the advance of a voltage driven type of a semiconductor device having a large capacity, a large current can now be turned on and off.

Non-saturatable reactors 2a and 2b for reducing a rate of a rise of current dI/dt at a time of turning on, are usually provided between the three-level inverter circuit, and the respective positive and negative electrodes of the DC power source in order to prevent the semiconductor devices US1, US2, US3 and US4 from being destroyed by a sudden rise of a current. The sudden rise of a current especially occurs when a free wheel diode recovers in the opposite way because of the switching on of a semiconductor device positioned at the opposite side of the diode under a condition that a reverse recovery current is flowing into the free wheel diode.

However, using the above-mentioned snubber circuits and the non-saturatable reactors 2a and 2b suffer from the drawback that they become large and costly with the increase of a capacity and a voltage of the three-level inverter circuit.

On the other hand, in recent years, with the advance of a voltage driven type of a semiconductor device, a high voltage, large current can be turned on and off at high speed, for example, a high voltage and large capacity inverter circuit controlling several thousands of DC volts is put to practical use as a multi-level inverter circuit.

However, as described above, it is desired to improve the multi-level inverter circuit, because of the problems of a cost and reliability resulting from the snubber circuits and the non-saturatable reactors 2a and 2b, which include many components rendering an NPC inverter control system large in size.

SUMMARY OF THE INVENTION

Accordingly, one object of this invention is to provide an NPC inverter control system which reduces a rate of a rise of current dI/dt of a current flowing into a semiconductor device constituting a multi-level inverter circuit and improve miniaturization, a cost and reliability.

In accordance with the above intention, the present invention provides an NPC inverter control system, including a DC power source having a neutral point located at a junction between a pair of capacitors which are serially connected with a positive electrode and a negative electrode. A multi-level inverter circuit having a plurality of semiconductor devices is coupled to the DC power source and configured to invert the DC power source to an AC power and to supply the AC power to a load. The control system further includes a plurality of saturatable reactors configured to join the positive and negative electrodes of the DC power source to the multi-level inverter circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

The present invention will hereinafter be described in detail by way of an illustrative embodiment.

Figure 2:
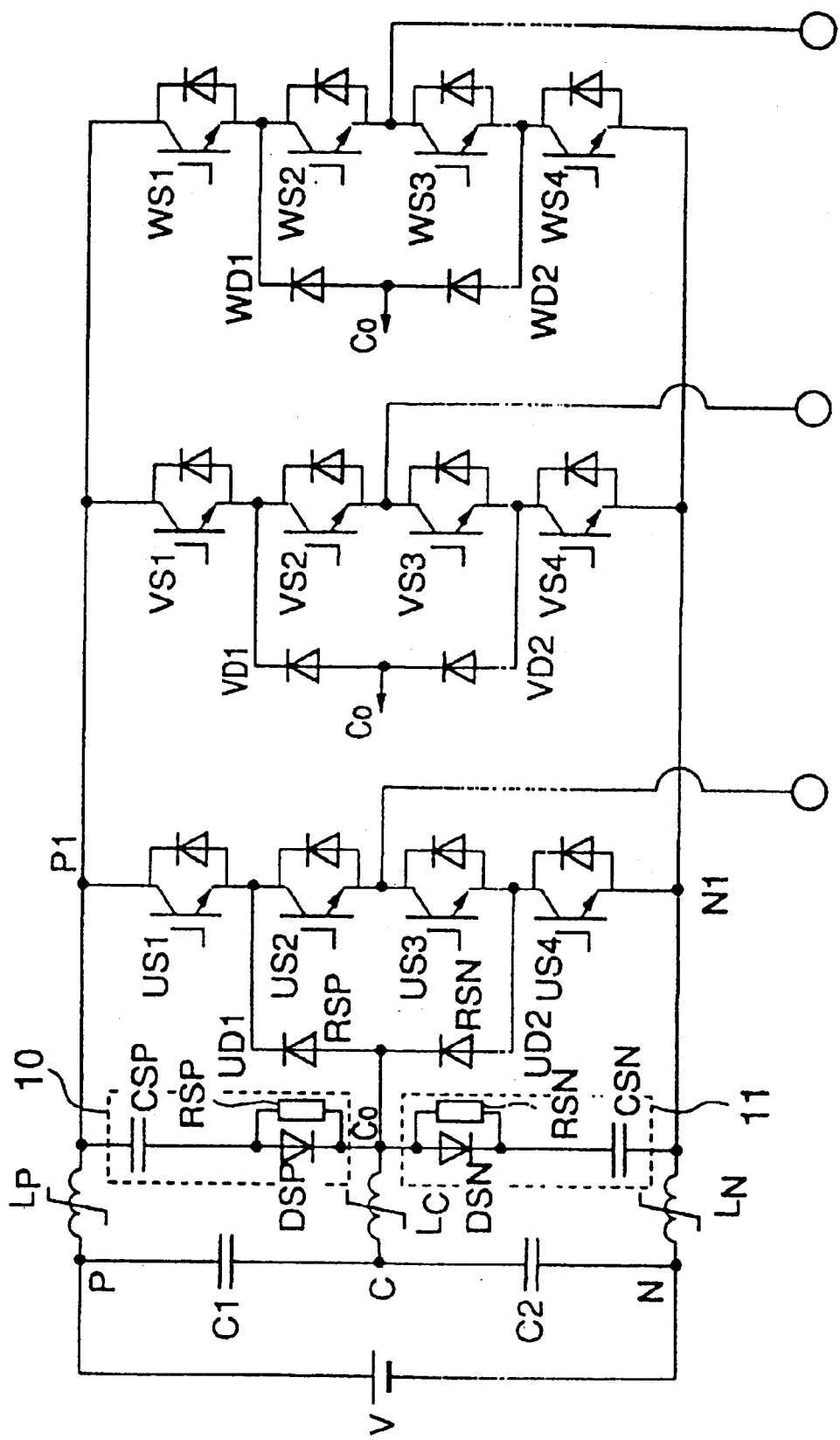
FIG. 2 is a circuit diagram showing an NPC inverter control system of a first embodiment of the present invention.

FIG. 2 is a circuit diagram showing an NPC inverter control system of a first embodiment of the present invention. Referring now to the drawings, wherein like reference numerals designate identical or corresponding parts throughout the several views, the embodiment of the present invention is described below.

FIG. 2 shows the NPC inverter control system controlling a three-phase AC power which may be adapted to an inverter apparatus having a relatively small capacity.

Figure 1:
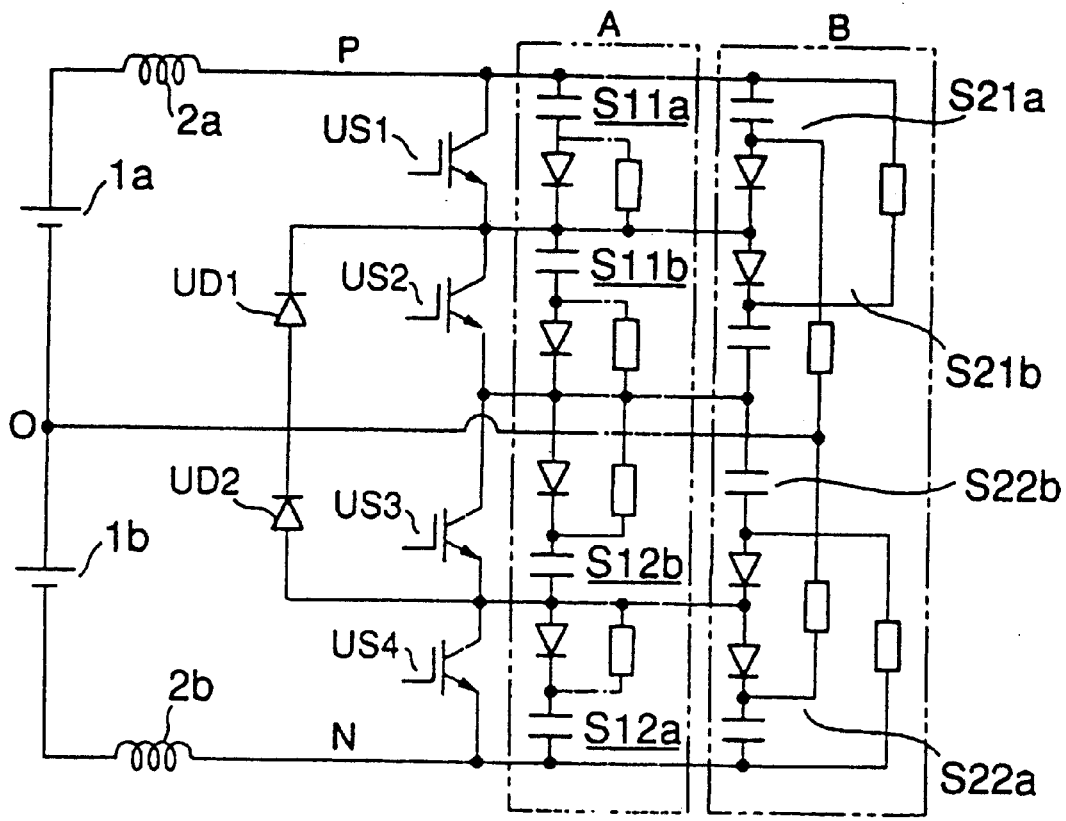
FIG. 1 is a circuit diagram showing a conventional NPC inverter control system.

The NPC inverter control system of the first embodiment, as shown in FIG. 2, includes a DC power source V (instead of the DC power sources 1a and 1b shown in FIG. 1), a neutral point C corresponding to a junction of a pair of capacitors C1 and C2 connected in serial one another, a positive electrode P, and a negative electrode N.

In this embodiment, the above described non-saturatable reactors 2a and 2b connected to the positive and the negative electrodes P and N of the DC power sources 1a and 1b, are eliminated and are replaced with saturatable reactors LP and LN connected to a common bus line of the positive and negative electrodes P and N, and which join the positive and negative electrodes P and N of the DC power source V to three three-level inverter circuits controlling respective U, V and W-phases. Furthermore, a saturatable reactor LC joins the neutral point C of the DC power source V to the three-level inverter circuits.

Moreover, the above described charge and discharge type of the snubber circuits S11a, S11b, S12a and S12b respectively connected to the semiconductor devices US1, US2, US3 and US4, and clamp type of the snubber circuits S21a, S21b, S22a and S22b, are eliminated and are replaced with surge voltage restraining circuits 10 and 11 connected between the negative electrode N and the neutral point C of the DC power source V, and the positive electrode P and the neutral point C of the DC power source V. The surge voltage restraining circuit 10 is composed of a diode DSP connected to a capacitor CSP in series and a resistor RSP connected to the diode DSP in parallel. Likewise, the surge voltage restraining circuit 11 is composed of a diode DSN connected to a capacitor CSN in series and a resistor RSN connected to the diode DSN in parallel.

The operation of the NPC inverter control system of the above embodiment is explained with reference to FIGS. 3 to 5.

An effect on the operation of saturatable reactors connected to the three-level inverter circuit for only U-phase in FIG. 2 is explained hereinafter.

Figure 3A:
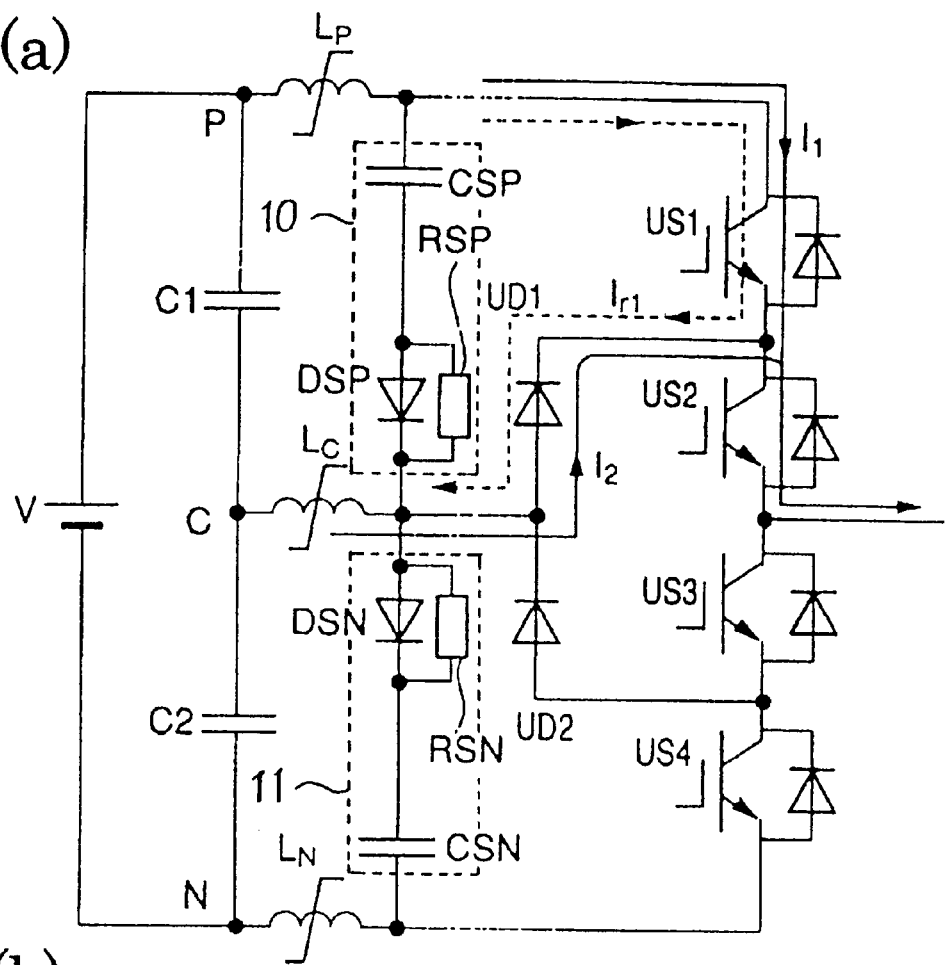
FIG. 3(a), is a circuit diagram showing an operation of the NPC inverter control system of the first embodiment.
Figure 3B:
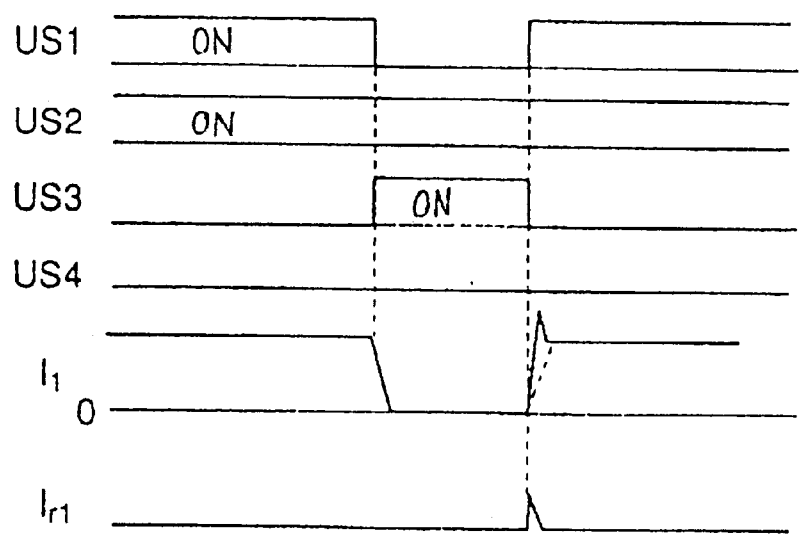
FIG. 3(b) is a timing chart showing an operation of the NPC inverter control system of the first embodiment.

As shown in FIG. 3(a), when a semiconductor device US1 turns off in a situation wherein semiconductor devices US1 and US2 are on and a current I1 flows into a load, a current I2 flows from the neutral point C via a clamp diode UD1.

The current I2 from the neutral point C continues to flow via the clamp diode UD1 at a powering mode, even when a semiconductor device US3 turns on after the semiconductor device US1 turns off.

When the semiconductor device US3 turns off and then the semiconductor device US1 turns on, a reverse recovery current Ir1 caused by an electric charge of the clamp diode UD1 flows along a course including the positive electrode P of the DC power source, the saturatable reactor LP, the semiconductor device US1, the clamp diode UD1, the saturatable reactor LC and the neutral point C. As a result, a short-circuit current I1 flows as represented in a solid line in FIG. 3(b). However, in this condition, a rate of a rise of current (dI/dt) may be reduced by the saturatable reactors LP and LC as shown in a broken line in FIG. 3(b).

Accordingly, switching losses of the semiconductor device US1 and the clamp diode UD1 may be reduced, thereby preventing semiconductor devices from destroyed due to an excessive sudden rise of current.

Figure 4A:
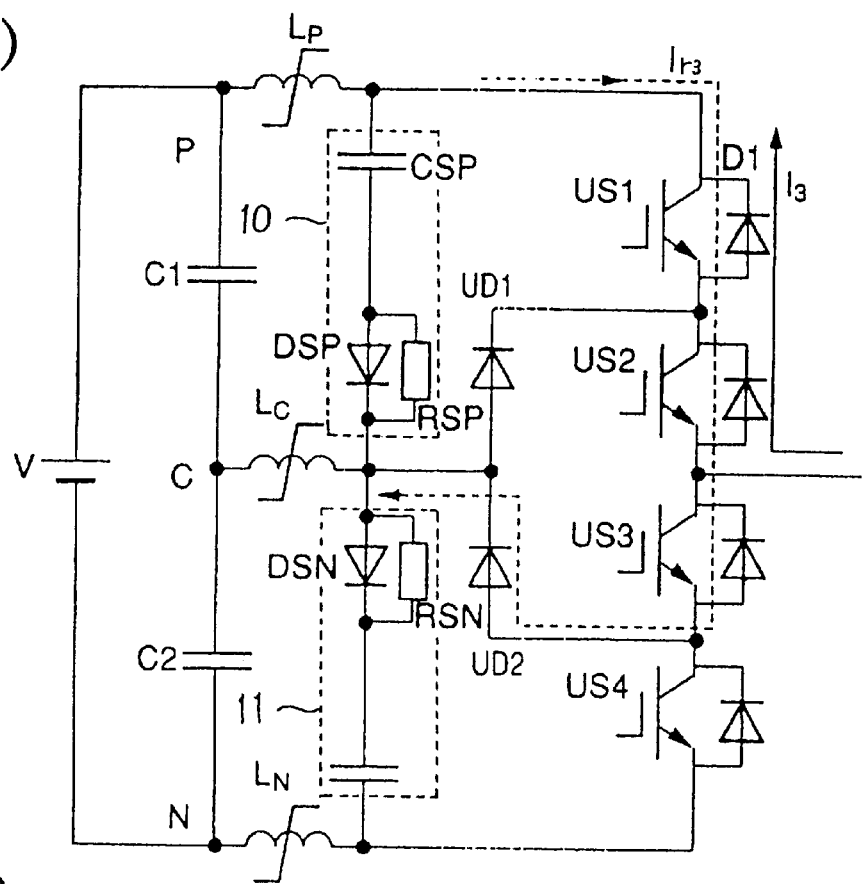
FIG. 4(a) is a circuit diagram showing an operation of the NPC inverter control system of the first embodiment.
Figure 4B:
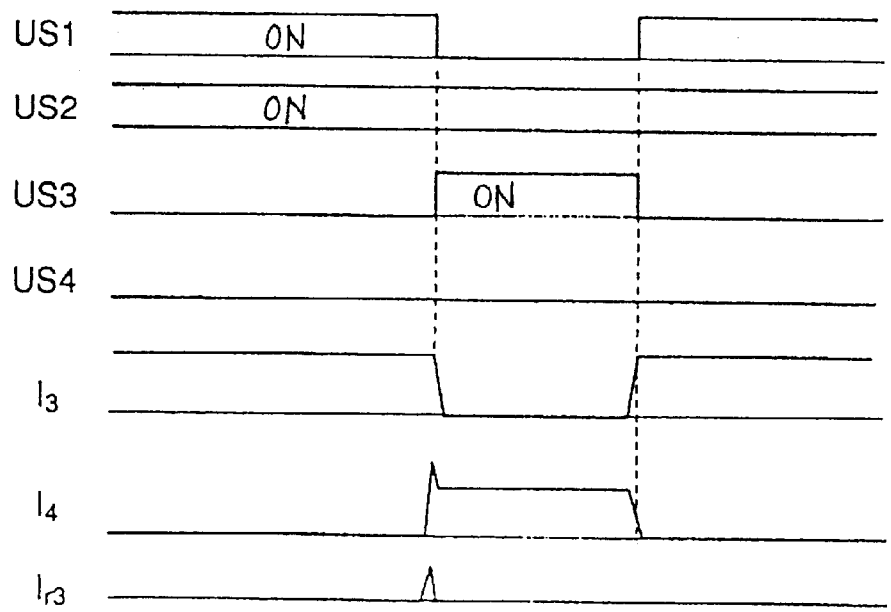
FIG. 4(b) is a timing chart showing an operation of the NPC inverter control system of the first embodiment.
Figure 5:
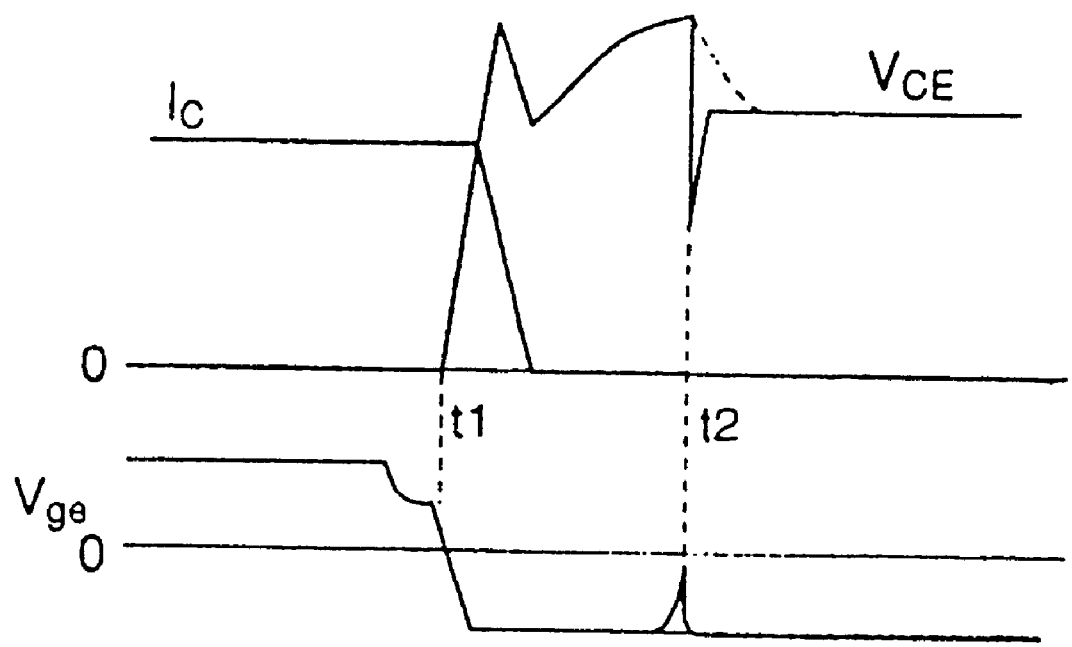
FIG. 5 is a timing chart showing an operation of the NPC inverter control system of the first embodiment.

When the semiconductor device US1 turns off and then the semiconductor device US3 turns on in a condition wherein the semiconductor devices US1 and US2 are on and a regenerative current I3 flows as shown in FIG. 4, a positive side short-circuit current of a reverse recovery current Ir3 caused by a free wheel diode D1 flows in a course of the positive electrode P of the DC power source V, the saturatable reactor LP, the free wheel diode D1, the semiconductor devices US2 and US3, the clamp diode UD2, the saturatable reactor LC and the neutral point C. The current Ir3 is generally added to a load current I4, but a sudden change of the reverse recovery current Ir3 may be restrained by the saturatable reactors LP and LC.

In case of the absence of the saturatable reactor LC, a sudden rise of current (dI/dt) may not be reduced effectively, because a reverse recovery current of the clamp diode UD1 at a powering mode flows in the same direction as a current flowing into the saturatable reactor LP at the powering mode, that is, the saturatable reactor LP is already saturated.

In case of the absence of the saturatable reactors LP and LN, a sudden change (dI/dt) of the reverse recovery current Ir3 caused by the free wheel diode D1 of the semiconductor device US1 or US4 may not be restrained, because the reverse recovery current Ir3 in a regenerative mode flows in the same direction as a current flowing into the saturatable reactor LC at the regenerative mode.

Accordingly, a rate of a rise of current (dI/dt) of the load current I4 in every mode may be reduced by connecting the saturatable reactors LP, LC and LN to the positive and negative electrodes P and N of the DC power source, and the neutral point C as shown in FIG. 2.

The surge voltage restraining circuits 10 and 11, which are connected between the negative electrode N and the neutral point C of the DC power source V, and the positive electrode P and the neutral point C of the DC power source V, restrain a surge voltage caused by charged energy of the saturatable reactors LP, LC and LN at the time any one of the semiconductor devices US1 US4 turns off.

Each of the capacitors CSP and CSN of the surge voltage restraining circuits 10 and 11 is charged via one of the diodes DSP and DSN and discharged via one of the resistors RSP and RSN.

According to a result of an experimentation, the saturatable reactors LP, LC and LN have an effect on restraining a sudden voltage change (dV/dt), although the sudden voltage change (dV/dt), which is caused by a reverse recovery current of the diodes DSP and DSN, generates at a time t2, when a current Ic of the semiconductor device turns off at a time t1. Further, the saturatable reactors LP, LC and LN have a secondary effect on restraining a disturbance wherein a negative gate voltage turns to a positive direction.

Operations of the other three-level inverter circuits for controlling V and W-phases are the same as the above described three-level inverter circuit controlling the U-phase.

According to the NPC inverter control system of the above embodiment, since the saturatable reactors LP, LC and LN join the positive electrode P of the DC power source V having the neutral point C, the negative electrode N, and the neutral point C to the three-level inverter circuits, either a rate of a rise of current (dI/dt) or a rate of a rise of voltage (dV/dt) of the semiconductors US1~US4, VS1~VS4 and WS1~WS4 constituting the three-level inverter circuits, and a disturbance to a gate control circuit may be restrained. Further, a miniaturization, a cost and reliability of the NPC inverter control system may be improved.

Moreover, since the surge voltage restraining circuits 10 and 11 are connected between the negative electrode N and the neutral point C of the DC power source V, and the positive electrode P and the neutral point C of the DC power source V as the need arises, a surge voltage caused by the charged energy of the saturatable reactors LP, LC and LN and a wiring inductance between the DC power source V and the three-level inverter circuits, may be absorbed and restrained.

Figure 6:
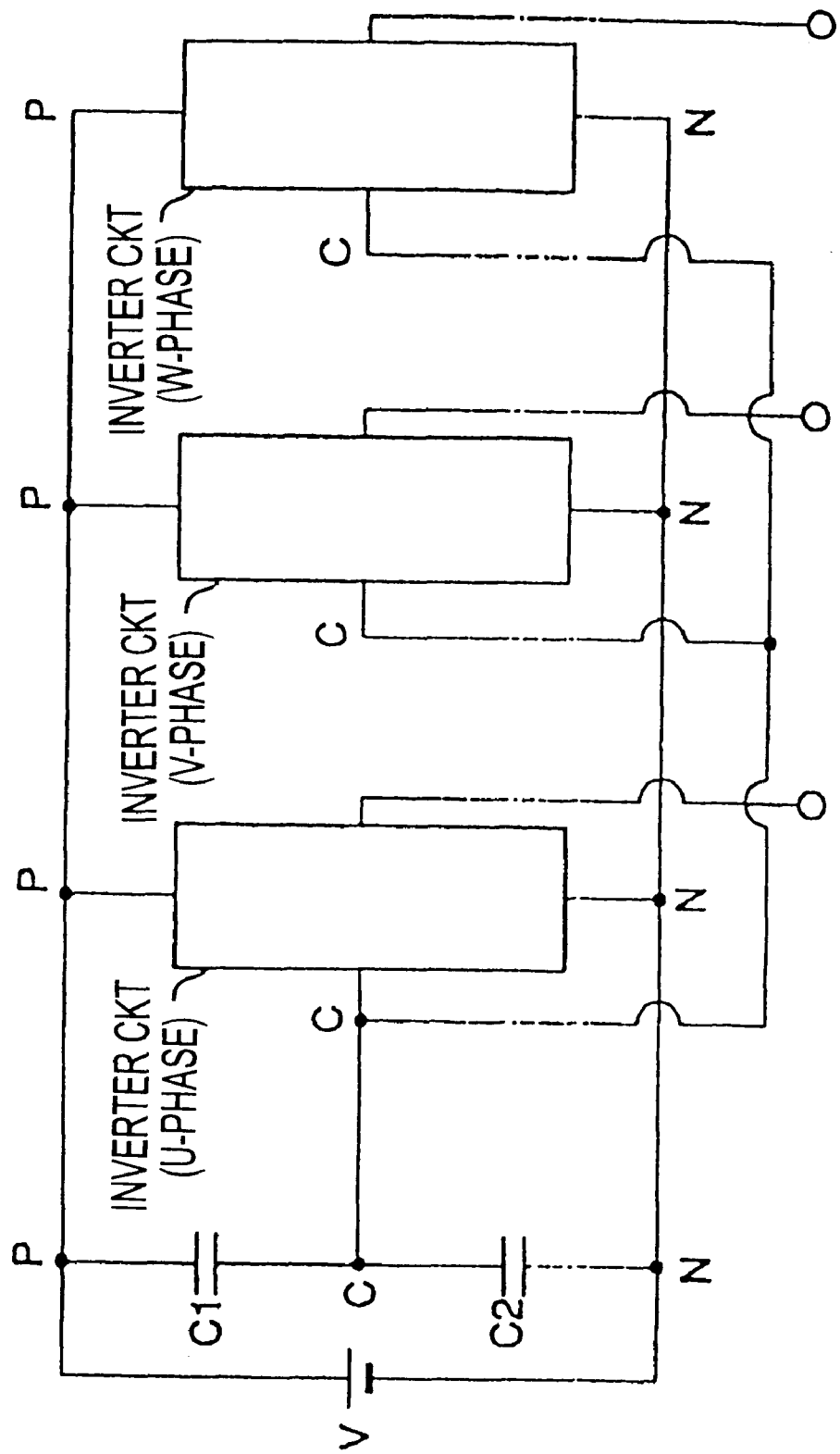
FIG. 6 is a circuit diagram showing an NPC inverter control system of a second embodiment of the present invention.

FIG. 6 is a circuit diagram showing an NPC inverter control system of a second embodiment of the present invention. The identical components compared with components in FIG. 2 are provided with the identical numerals, and an explanation of the identical components is omitted. The only different components are hereinafter described.

FIG. 6 shows the NPC inverter control system controlling a three-phase AC power which may be adapted to an inverter apparatus having a relatively large capacity.

Figure 7:
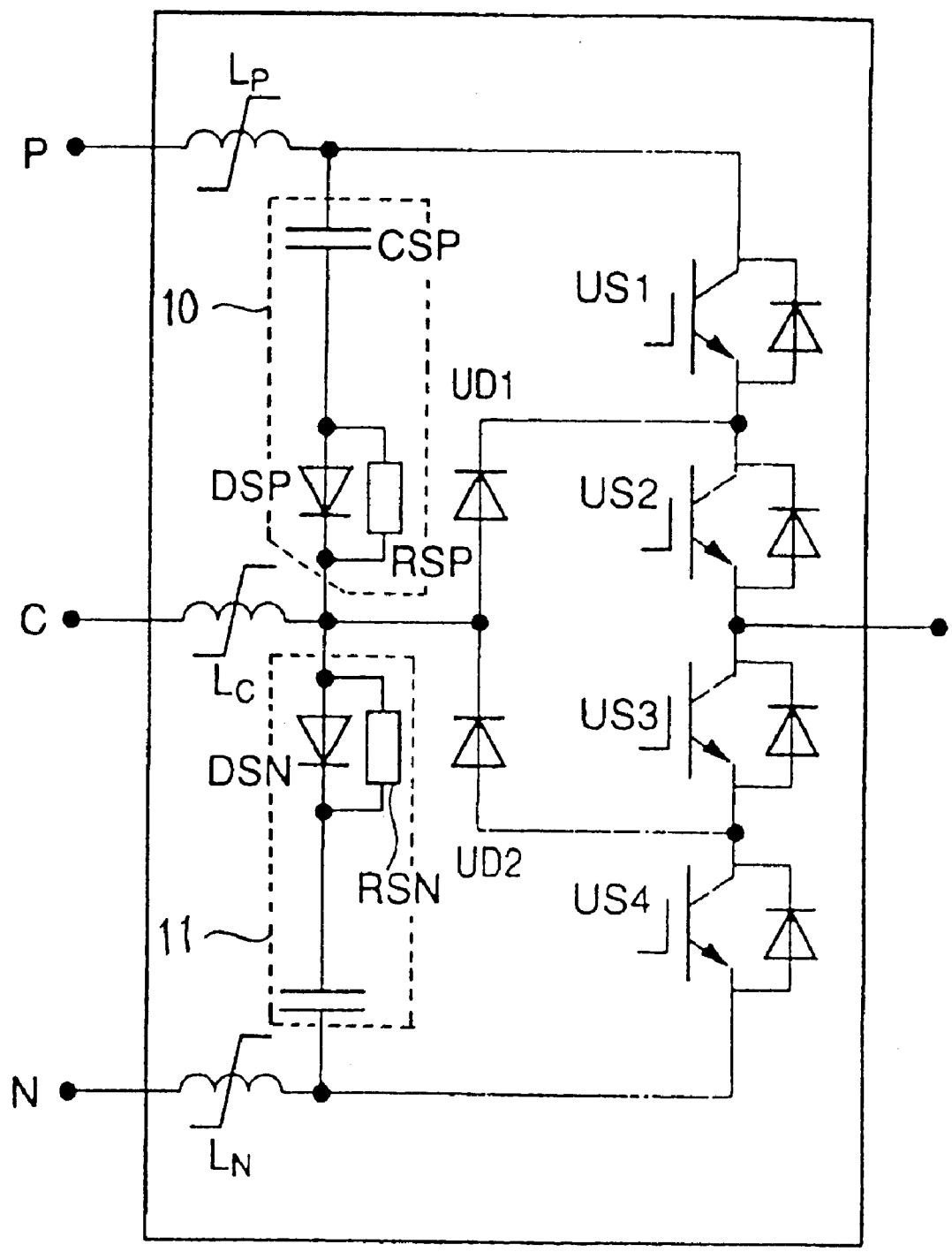
FIG. 7 shows saturatable reactors and surge voltage restraining circuits for one phase of three-level inverter circuits of the NPC inverter control system of the second embodiment.

The above described saturatable reactors LP, LC and LN and the surge voltage restraining circuits 10 and 11 are provided to each phase of the three-level inverter circuits as shown in FIG. 6. FIG. 7 shows only one of the three-level inverter circuits controlling a U-phase. The semiconductor devices US1~US4, VS1~VS4 and WS1~WS4 constituting three three-level inverter circuits are not provided with snubber circuits.

Since the above NPC inverter control system operates in the same way as the NPC inverter control system of the first embodiment, an explanation of the operation is omitted.

According to the second embodiment, since the saturatable reactors LP, LC and LN are connected between the positive electrode P of the DC power source V, the negative electrode N and the neutral point C, and each phase of the three-level inverter circuits respectively, a sudden rise of current may be restrained without any interference between three phases. The sudden rise of current occurs when a current starts to flow into the saturatable reactors LP, LN and LC. A rate of a rise of current (dI/dt) of the semiconductor devices US1~US4, VS1~VS4 and WS1~WS4 constituting the three-level inverter circuits may be reduced, thereby reducing stress and increasing a capacity of the NPC inverter control system.

As described above, the NPC inverter control system of the second embodiment may have an effect on restraining a sudden rise of current without any interference between three phases in addition to the same effect as the first embodiment. Further, a rate of a rise of current (dI/dt) of the semiconductor devices US1~US4, VS1~VS4 and WS1~WS4 constituting the three-level inverter circuits may be reduced, thereby reducing a stress and increasing a capacity of the NPC inverter control system.

An NPC inverter control system of a third embodiment replaces the saturatable reactors LP, LN and LC in the first and second embodiments in a manner such that the saturatable reactors LP, LN and LC have the properties of a high relative magnetic permeability and an angular B-H curve, and a volt-time product, which is calculated by multiplying a time and a voltage together, of each of the saturatable reactors LP, LN and LC is set to ensure a time more than a voltage drop time (tr) of one of the semiconductor devices constituting the three-level inverter circuits, a reverse recovery time (trr) or a forward recovery time (tfr). The reverse recovery time (trr) is a time that a reverse recovery current Irr flows into a diode. The reverse recovery current Irr is caused when the diode is applied a reverse voltage while a forward current I flows into the diode. The forward recovery time is a time wherein a transitional voltage (vfr) is applied to a diode. The transitional voltage (vfr) generates at a time wherein a sudden forward current flows into the diode.

An operation of the third embodiment described above is explained with reference to FIG. 8.

Figure 8A:
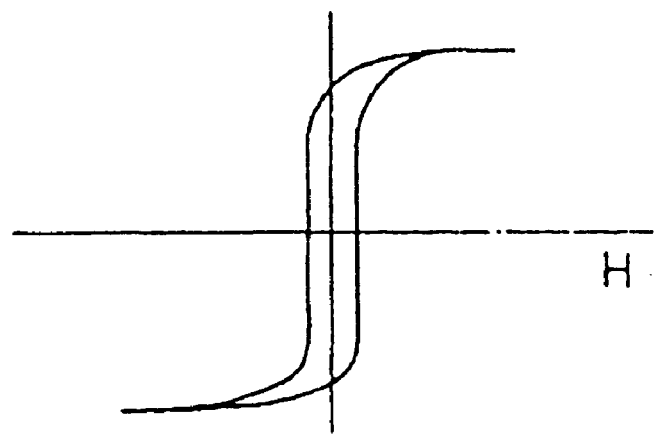
FIG. 8(a) shows a B-H curve representing a relationship between fluxes (B) and electric field strength (H) of saturatable reactors of an NPC inverter control system of a third embodiment.
Figures 8B, 8C:
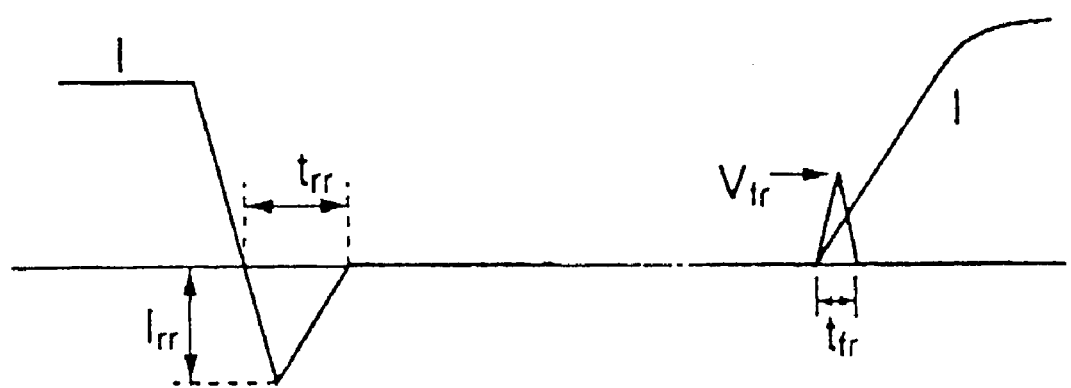
FIG. 8(b) shows a reverse recovery property of diodes.
FIG. 8(c) shows a forward recovery property of diodes at a time that a current flows into the diodes.

FIG. 8(a) shows a B-H curve representing a relationship between fluxes (B) and electric field strength (H) of the saturatable reactors LP, LN and LC. FIG. 8(b) shows a reverse recovery property of diodes. FIG. 8(c) shows a forward recovery property of diodes at a time that a current flows into the diodes.

As shown in FIG. 8(a), it is preferable that the B-H curve has an angular shape, that is, the saturatable reactors LP, LN and LC can be saturated in a short time, for example, several microseconds.

The reverse recovery current (Irr) shown in FIG. 8(b) is restrained by an effect of the saturatable reactors LP, LN and LC during the reverse recovery time (trr).

With respect to FIG. 8(c), during a turn on time needed for the semiconductor device to turn off completely, that is the voltage drop time (tr), if a sudden current flows into a diode, a turn-on loss becomes large due to the transitional voltage (vfr) during the forward recovery time (tfr). However, since the sudden rise of current is restrained by the saturatable reactors LP, LN and LC, the turn-on loss may be reduced.

It is needed that an operating time of the saturatable reactors LP, LN and LC ensures at least the reverse recovery time (trr) of the semiconductor device, the voltage drop time (tr) and the forward recovery time (tfr). Saturatable reactors having a volt-time product and satisfying such conditions are adopted. A satisfactory effect can be achieved in practice if the operating time is. several microseconds.

As described above, in addition to the same effect as the first or second embodiment, the NPC inverter control system of the third embodiment may reduce a switching loss of the semiconductor devices US1~US4, VS1~VS4 and WS1~WS4, because a current starts to flow after the semiconductor devices turn on.

Figure 9:
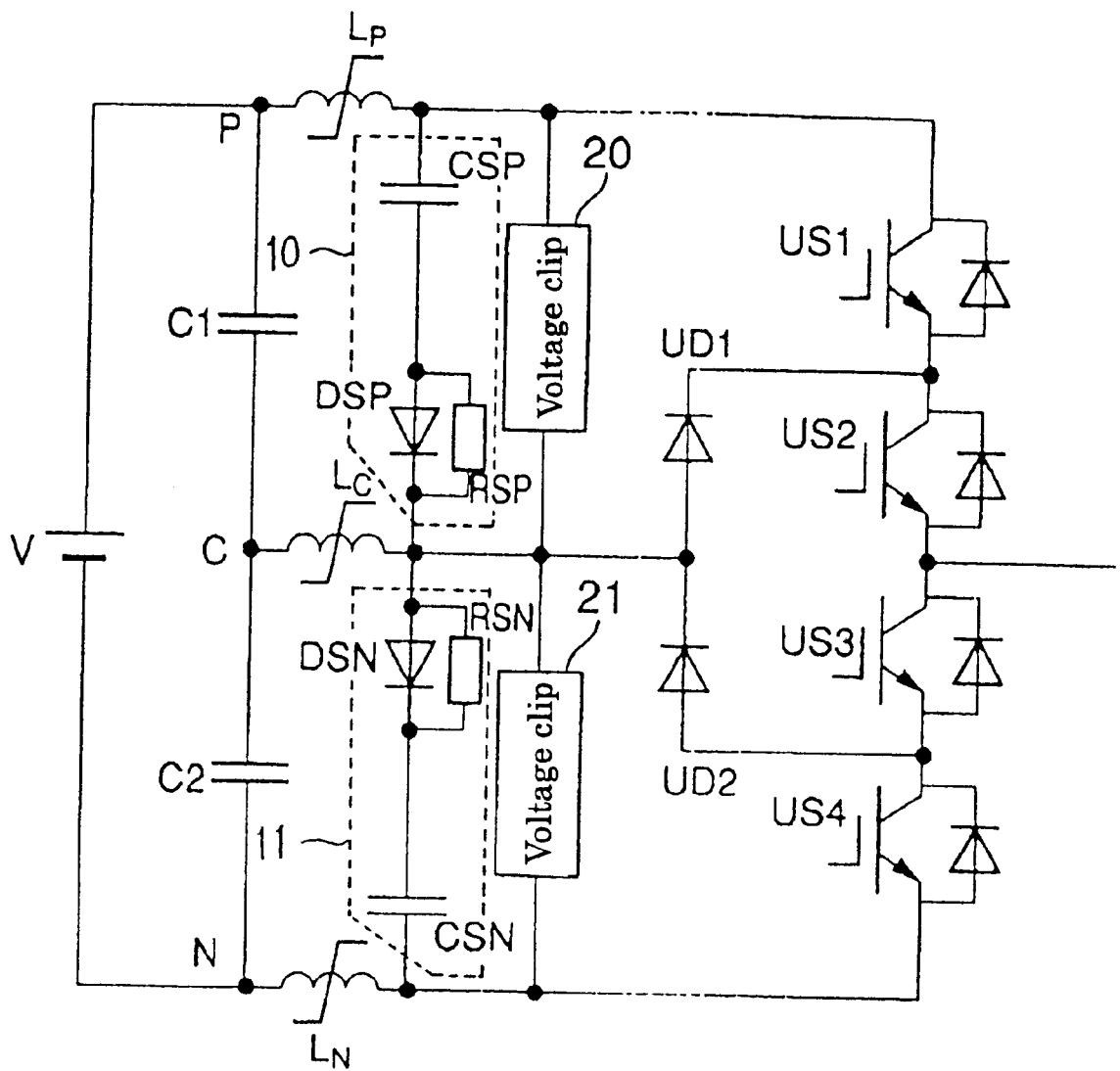
FIG. 9 is a circuit diagram showing an NPC inverter control system of a fourth embodiment of the present invention.

FIG. 9 is a circuit diagram showing an NPC inverter control system of a fourth embodiment of the present invention. The identical components compared with components in FIGS. 2 and 7 are provided with the identical numerals, and an explanation of the identical components is omitted. The only different components are hereinafter described.

FIG. 9 gives one constituent example showing only one phase (U-phase) of the three-level inverter circuits as a representative example.

As shown in FIG. 9, the NPC inverter control system of the fourth embodiment further includes surge voltage clipping devices 20 and 21 such as nonlinear resistors, respectively connected in parallel to the surge voltage restraining circuits 10 and 11 shown in FIGS. 2 and 7.

Since the above NPC inverter control system operates in the same way as the NPC inverter control system of the first or second embodiment, an explanation of the operation is omitted.

According to the fourth embodiment, since the surge voltage clipping devices 20 and 21 are connected in parallel to the surge voltage restraining circuits 10 and 11, a large surge voltage which may not be restrained by the surge voltage restraining circuits 10 and 11, may be clipped at a predetermined voltage (regular voltage), thereby reducing a rating of the components of the surge voltage restraining circuits 10 and 11, and miniaturizing the surge voltage restraining circuits 10 and 11. Such a large surge voltage may occur when a large current is shut-off.

As described above, in addition to the same effect as the first or second embodiment, the NPC inverter control system of the fourth embodiment may reduce a rating of the components of the surge voltage restraining circuits and miniaturize the surge voltage restraining circuits.

Figure 10:
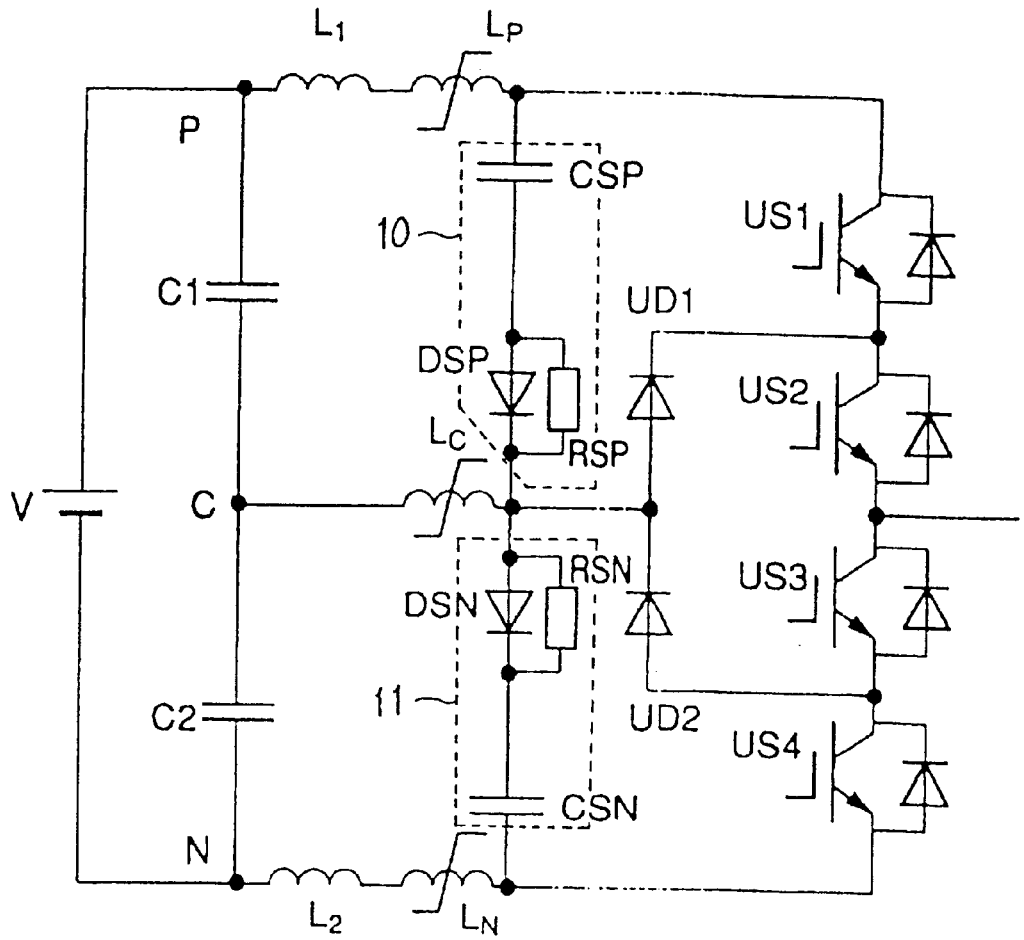
FIG. 10 is a circuit diagram showing an NPC inverter control system of a fifth embodiment of the present invention.

FIG. 10 is a circuit diagram showing an NPC inverter control system of a fifth embodiment of the present invention. The identical components compared with components in FIGS. 2 and 7 are provided with the identical numerals, and an explanation of the identical components is omitted. The only different components are hereinafter described.

FIG. 10 gives one constituent example showing only one phase (U-phase) of the three-level inverter circuits as a representative example.

As shown in FIG. 10, the NPC inverter control system of the fifth embodiment includes a serial circuit of a non-saturatable reactor L1 and a saturatable reactor LP connected between the three-level inverter circuit and the positive electrode P, a serial circuit of a non-saturatable reactor L2 and a saturatable reactor LN connected between the three-level inverter circuit and the negative electrode N, a saturatable reactor LC connected between the three-level inverter circuit and the neutral point C, and the surge voltage restraining circuits 10, 11 connected between the negative electrode N and the neutral point C of the DC power source V, and the positive electrode P and the neutral point C of the DC power source V.

Since the above NPC inverter control system operates in the same way as the NPC inverter control system of the first or second embodiment, an explanation of the operation is omitted.

According to the fifth embodiment, both the non-saturatable reactors L1 and L2, and the saturatable reactors LP, LN and LC are used together and restrain a sudden rise of current of the semiconductor devices US1~US4, VS1~VS4 and WS1~WS4. Therefore, a current peak of the short-circuit currents may be reduced. As a result, semiconductor devices having a relatively low proof against short-circuit currents may be adopted as the semiconductor devices US1~US4, VS1~VS4 and WS1~WS4.

As described above, in addition to the same effect as the first or second embodiment, the NPC inverter control system of the fifth embodiment may reduce a current peak of the short-circuit currents. Further, semiconductor devices having a relatively low proof against short-circuit currents may be adopted.

Figure 11:
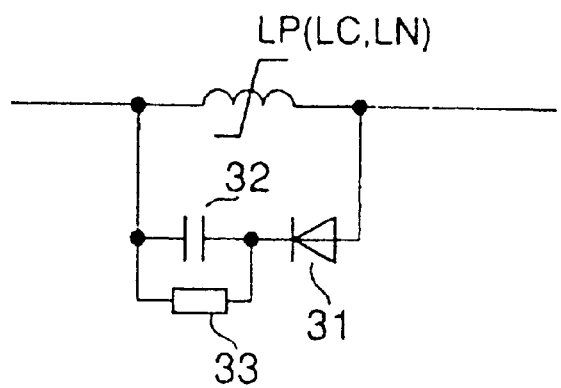
FIG. 11 is a circuit diagram showing an NPC inverter control system of a sixth embodiment of the present invention.

As shown in FIG. 11, the NPC inverter control system of a sixth embodiment further includes three inverse voltage restraining snubber circuits connected in parallel to each of the saturatable reactors LP, LC and LN in order to absorb an inverse voltage generating at the time of a discharge (reset) of one of the saturatable reactors LP, LC and LN, in addition to any one of the NPC inverter control systems of the first, second and fifth embodiments.

Each of the inverse voltage restraining snubber circuits is composed of a diode 31 connected to a capacitor 32 in serial and a resistor 33 connected to the diode 31 in parallel.

Since the above NPC inverter control system operates in the same way as the NPC inverter control system of the first, second or fifth embodiment, an explanation of the operation is omitted.

According to the sixth embodiment, since the inverse voltage restraining snubber circuits are connected in parallel to the saturatable reactors LP, LC and LN, the surge voltage restraining circuits 10 and 11 may be made smaller or removed.

As described above, in addition to the same effect as the first, second or fifth embodiment, the NPC inverter control system of the sixth embodiment may make the surge voltage restraining circuits 10 and 11 smaller or removed.

Figure 12:
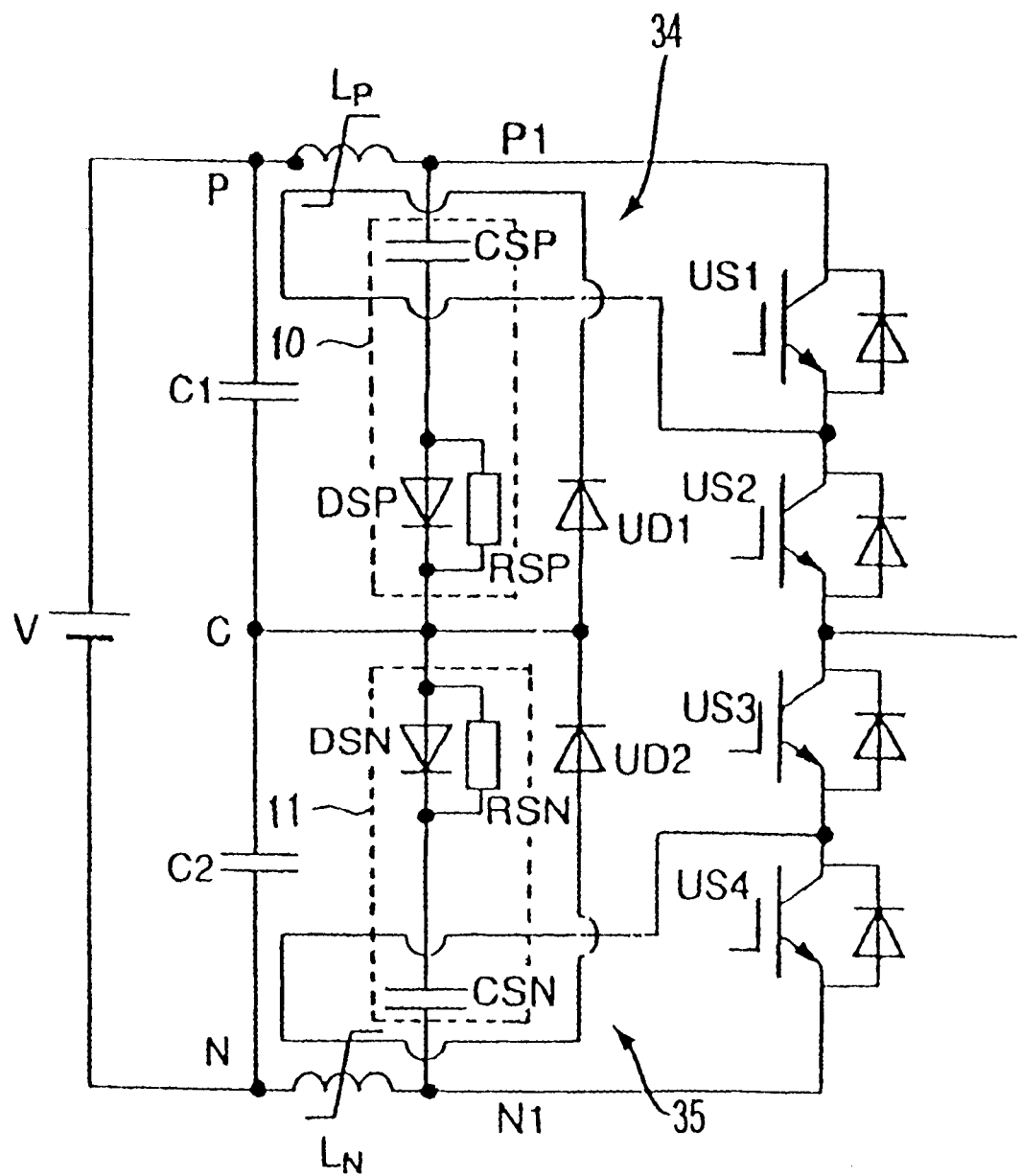
FIG. 12 is a circuit diagram showing an NPC inverter control system of a seventh embodiment of the present invention.

FIG. 12 is a circuit diagram showing an NPC inverter control system of a seventh embodiment of the present invention. The identical components compared with components in FIGS. 2 and 7 are provided with the identical numerals, and an explanation of the identical components is omitted. The only different components are hereinafter described.

FIG. 12 gives one constituent example showing only one phase (U-phase) of the three-level inverter circuits as a representative example.

As shown in FIG. 12, the NPC inverter control system of the seventh embodiment includes a saturatable reactor LP connected between the three-level inverter circuit and the positive electrode P, a saturatable reactor LN connected between the three-level inverter circuit and the negative electrode N, two discharge circuits 34 and 35 connected between the three-level inverter circuit and the neutral point C so that currents flowing into the discharge circuits via diodes UD1 and UD2 discharge and reset the saturatable reactors LP and LN respectively, and the surge voltage restraining circuits 10 and 11 connected between the negative electrode P after the saturatable reactor LP and the neutral point C of the DC power source V, and the positive electrode N after the saturable reactor LN and the neutral point C of the DC power source V.

Since the above NPC inverter control system operates in the same way as the NPC inverter control system of the first or second embodiment, an explanation of the operation is omitted.

According to the seventh embodiment, the saturable reactors LP and LN are connected between the three-level inverter circuit, and the respective positive and negative electrodes P and N, and discharge circuits 34 and 35 are connected between the three-level inverter circuit and the neutral point C so that currents flowing into the discharge circuits 34 and 35 via diodes UD1 and UD2 discharge and reset the saturable reactors LP and LN respectively, and further the surge voltage restraining circuits 10 and 11 are connected between the negative electrode P after the saturable reactor LP and the neutral point C, and the positive electrode N after the saturable reactor LN and the neutral point C, thus dispensing with the saturable reactor LC at the neutral point C and achieving the same effect as a case that the saturable reactor LC is connected to the neutral point C.

As described above, in addition to the same effect as the first or second embodiment, the NPC inverter control system of the seventh embodiment may dispense with the saturable reactor LC at the neutral point C and obtain the same effect as a case that the saturable reactor LC is connected to the neutral point C.

The NPC inverter control system of the eighth embodiment modifies the fifth embodiment of the present invention in a manner such that the serial circuit of the non-saturable reactor L1 and the saturable reactor LP, the serial circuit of the non-saturable reactor L2 and the saturable reactor LN, the saturable reactor LC, and the surge voltage restraining circuits 10 and 11, which are described in the fifth embodiment, are connected to each phase, that is U-phase, V-phase and W-phase, of the three-level inverter circuits.

Since the above NPC inverter control system operates in the same way as the NPC inverter control system of the fifth embodiment, an explanation of the operation is omitted.

According to the eighth embodiment, the non-saturable reactors L1 and L2 are connected to a common bus line of the positive and negative electrodes P and N of the DC power source, and the saturable reactors LP, LN and LC are connected to each phase of the three-level inverter circuit, thus obtaining more effective operation than the fifth embodiment.

As described above, the NPC inverter control system of the eighth embodiment may achieve the same effect as the fifth embodiment more effectively.

The NPC inverter control system of the ninth embodiment modifies the eighth embodiment of the present invention in a manner such that the non-saturable reactors L1 and L2 are replaced with saturable reactors.

Since the above NPC inverter control system operates in the same way as the NPC inverter control system of the eighth embodiment, an explanation of the operation is omitted.

According to the ninth embodiment, the non-saturable reactors L1 and L2 are substituted to saturable reactors, that is, saturable reactors are connected to a common bus line of the positive and negative electrodes P and N, and to each phase of the three-level inverter circuits, thereby obtaining the same effect as the eighth embodiment more effectively.

As described above, the NPC inverter control system of the ninth embodiment may achieve the same effect as the eighth embodiment more effectively.

Although the saturable reactors LP and LN connected to a common bus line of the positive and negative electrodes P and N, and the saturable reactor LC connected to the neutral point C are provided in the first embodiment, the only saturable reactors LP and LN may be connected between the three-level inverter circuit and the positive and negative electrodes P and N, or the only saturable reactor LC may be connected to the neutral point C.

Although the saturable reactors LP and LN connected to each phase of the three-level inverter circuits, and the saturable reactor LC connected to each phase of the three-level inverter circuits in the second embodiment, the only saturable reactors LP and LN may be connected to each phase of the three-level inverter circuits, or the only saturable reactors LC may be connected to each phase of the three-level inverter circuits.

As described above, according to the present invention, since saturable reactors are connected between a multi-level inverter circuit, and either a positive electrode and a negative electrode of a DC power source having a neutral point, or the neutral point, a rate of a rise of current (dI/dt) and a rate of a rise of voltage (dV/dt) of semiconductor devices constituting the multi-level inverter circuit, and a disturbance of a gate controller may be restrained. Further, a miniaturization, a cost and reliability of an NPC inverter control system may be improved.

Moreover, since surge voltage restraining circuits are connected between the negative electrode and the neutral point of the DC power source, and the positive electrode and the neutral point of the DC power source as the need arises, a surge voltage caused by charged energy of the saturable reactors and a wiring inductance between the DC power source and the three-level inverter circuits may be absorbed and restrained.

Various modifications and variations are possible in light of the above teachings. Therefore, it is to be understood that within the scope of the appended claims, the present invention may be practiced otherwise than as specifically described herein.

What is claimed is:

1. An NPC inverter control system, comprising:
    a DC power source having a neutral point corresponding to a junction of a pair of capacitors serially connected with one another, a positive electrode and a negative electrode;
    a multi-level inverter circuit having a plurality of semiconductor devices coupled to said DC power source and configured to invert DC power to AC power; and
    a plurality of saturable reactors configured to join the positive and negative electrodes of said DC power source to said multi-level inverter circuit.

2. An NPC inverter control system, comprising:
    a DC power source having a neutral point corresponding to a junction of a pair of capacitors which are serially connected with one another, a positive electrode and a negative electrode;
    a multi-level inverter circuit having a plurality of semiconductor devices connected in a bridge configuration with each other, coupled to said DC power source and configured to invert DC power to AC power; and
    a saturable reactor configured to join said neutral point of said DC power source to said multi-level inverter circuit.

3. An NPC inverter control system, comprising:
- a DC power source having a neutral point corresponding to a junction of a pair of capacitors serially connected with one another, a positive electrode and a negative electrode;
- a multi-level inverter circuit having a plurality of semiconductor devices connected in a bridge configuration with each other, coupled to said DC power source and configured to invert DC power to AC power; and
- a plurality of saturatable reactors configured to join said positive and negative electrodes and said neutral point of said DC power source to said multi-level inverter circuit.

4. The NPC inverter control system as recited in claim 1, further comprising:
- a plurality of surge voltage restraining circuits configured to restrain a surge voltage, each surge voltage restraining circuit being connected between one of the negative electrode and said neutral point of said DC power source, and the positive electrode and said neutral point of said DC power source.

5. The NPC inverter control system as recited in claim 4, wherein each of said surge voltage restraining circuits comprises a diode connected to a capacitor in series, and a resistor connected to said diode in parallel.

6. The NPC inverter control system as recited in claim 4, further comprising:
- a plurality of voltage clipping devices configured to clip a surge voltage at a predetermined level, each of the voltage clipping devices being respectively connected to a surge voltage restraining circuit in parallel.

7. An NPC inverter control system, comprising:
- a DC power source having a neutral point at a junction of a pair of capacitors which are serially connected with one another, a positive electrode and a negative electrode;
- a plurality of multi-level inverter circuits having a plurality of semiconductor devices connected in a bridge configuration with each other, said multi-level inverter circuits being coupled to said DC power source and configured to invert power from said DC power source to a multi-phase AC power; and
- a plurality of saturatable reactors each configured to respectively join one of the positive and negative electrodes of said DC power source to said multi-level inverter circuits.

8. An NPC inverter control system, comprising:
- a DC power source having a neutral point at a junction of a pair of capacitors which are serially connected with one another, a positive electrode and a negative electrode;
- a plurality of multi-level inverter circuits each having a plurality of semiconductor devices connected in a bridge configuration with each other, each of said multi-level inverter circuits being coupled to said DC power source and configured to invert power from said DC power source to a multi-phase AC power; and
- a plurality of saturatable reactors each configured to respectively join said neutral point of said DC power source to said multi-level inverter circuits.

9. An NPC inverter control system, comprising:
- a DC power source having a neutral point corresponding to a junction of a pair of capacitors serially connected with one another, a positive electrode and a negative electrode;
- a plurality of multi-level inverter circuits having a plurality of semiconductor devices connected in a bridge configuration with each other, coupled to said DC power source and configured to invert power from said DC power source to a multi-phase AC power; and
- a plurality of saturatable reactors configured to join said positive and negative electrodes and said neutral point of said DC power source to respective said multi-level inverter circuits.

10. The NPC inverter control system as recited in claim 1, wherein each of said saturatable reactors has a high relative magnetic permeability and an angular B-H curve, a volt-time product of each of said saturatable reactors being set to produce a time product more than a voltage drop time (tr) of one of said semiconductor devices, a reverse recovery time (trr) or a forward recovery time (tfr).

11. The NPC inverter control system as recited in claim 1, further comprising:
- a plurality of snubber circuits configured to absorb an inverse voltage generated at the time of a discharge of one of said saturatable reactors, each of said snubber circuits being connected to a saturatable reactor.

12. The NPC inverter control system as recited in claim 11, wherein each of said snubber circuits comprises a diode connected to a capacitor in series, and a resistor connected to said diode in parallel.

13. The NPC inverter control system as recited in claim 7, further comprising:
- a plurality of surge voltage restraining circuits configured to restrain a surge voltage, said surge voltage restraining circuits being connected between the negative electrode and said neutral point of said DC power source, and the positive electrode and said neutral point of said DC power source, and wherein:
- a connection between the semiconductor devices and a snubber circuit is absent.

14. The NPC inverter control system as recited in claim 13, wherein each of said voltage surge restraining circuits comprises a diode connected to a capacitor in series, and a resistor connected to said diode in parallel.

15. The NPC inverter control system as recited in claim 13, further comprising:
- a plurality of voltage clipping devices which are configured to clip a surge voltage at a predetermined level and which are respectively connected to said voltage surge restraining circuits in parallel.

16. An NPC inverter control system, comprising:
- a DC power source having a neutral point corresponding to a junction of a pair of capacitors serially connected with one another, a positive electrode and a negative electrode;
- a multi-level inverter circuit having a plurality of semiconductor devices connected in a bridge configuration with each other, coupled to said DC power source and configured to invert power from said DC power source to an AC power;
- a plurality of reactor circuits comprising a serially connected a non-saturatable reactor and a saturatable reactor, each reactor circuit being configured to join one of the positive and negative electrodes of said DC power source to said multi-level inverter circuit;
- a neutral point saturatable reactor configured to join said neutral point of said DC power source to said multi-level inverter circuit; and
- a plurality of surge voltage restraining circuits configured to restrain a surge voltage, each of the surge voltage restraining circuits being connected between one of the negative electrode and said neutral point of said DC power source, and said positive electrode and said neutral point of said DC power source.

17. The NPC inverter control system as recited in claim 16, further comprising:
   a plurality of snubber circuits configured to absorb an inverse voltage at the time of a discharge of one of the saturatable reactors of said reactor circuits, said snubber circuits being each connected to one of the saturatable reactors of said reactor circuits.

18. The NPC inverter control system as recited in claim 17, wherein each of said snubber circuits comprises a diode connected to a capacitor in series, and a resistor connected to said diode in parallel.

19. An NPC inverter control system, comprising:
   a DC power source having a neutral point corresponding to a junction of a pair of capacitors serially connected with one another, a positive electrode and a negative electrode;
   a multi-level inverter circuit having a plurality of semiconductor devices connected in a bridge formation with each other, said multi-level inverter being coupled to said DC power source and configured to invert power from said DC power source to an AC power;
   a plurality of saturatable reactors each configured to join one of the positive and negative electrodes of said DC power source to said multi-level inverter circuit;
   a discharge circuit configured to join said neutral point of said DC power source to said multi-level inverter circuit so that a current flowing into said discharge circuit via a diode, discharges one of said saturatable reactors; and
   a plurality of surge voltage restraint circuits configured to restrain a surge voltage, each surge voltage restraint circuit being connected between one of the negative electrode and said neutral point of said DC power source, and the positive electrode and said neutral point of said DC power source.

20. An NPC inverter control system, comprising:
   a DC power source having a neutral point corresponding to a junction of a pair of capacitors serially connected with one another, a positive electrode and a negative electrode;
   a plurality of multi-level inverter circuits each having a plurality of semiconductor devices connected in a bridge configuration with each other, each multi-level inverter circuit being coupled to said DC power source and configured to invert power from said DC power source to a multi-phase AC power;
   first and second reactor circuits each comprising a non-saturatable reactor serially connected with a saturatable reactor, each reactor circuit being configured to join one of the positive and negative electrodes of said DC power source to each of said multi-level inverter circuits so that each first non-saturatable reactor is interposed between a saturable reactor and one of the positive and negative electrodes;
   a neutral point saturatable reactor configured to join said neutral point of said DC power source to each of said multi-level inverter circuits; and
   a plurality of surge restraining circuits configured to restrain a surge voltage, each surge retaining circuit being connected between one of the negative electrodes and said neutral point of said DC power source, and the positive electrode and said neutral point of said DC power source.

21. The NPC inverter control system as recited in claim 20, wherein each of said non-saturatable reactors is replaced with a saturatable reactor.

22. An inverter control system, comprising:
   a DC power source having positive and negative electrodes and a neutral point junction between a pair of capacitors which are serially connected with the positive and negative electrode respectively;
   a plurality of multi-level inverter circuits each having a plurality of semiconductor devices connected to said DC power source to invert power from said DC power source to a multi-phase AC power;
   first and second reactor circuits each comprising a non-saturatable reactor serially connected with a saturatable reactor, each reactor circuit joining one of the positive an negative electrodes of said DC power source with each of said multi-level inverter circuits;
   first and second serially connected surge restraining circuits respectively connected between one of the negative electrodes and said neutral point, and the positive electrode and said neutral point; and
   a neutral point saturable reactor interconnecting said neutral point and said plurality of multi-level inverter circuits.

* * * * *